(12) United States Patent
Chepets

(10) Patent No.: US 11,014,261 B1
(45) Date of Patent: May 25, 2021

(54) SAW ASSEMBLY

(71) Applicant: Igor Chepets, Brooklyn, NY (US)

(72) Inventor: Igor Chepets, Brooklyn, NY (US)

(*) Notice: Subject to any disclaimer, the term of this patent is extended or adjusted under 35 U.S.C. 154(b) by 0 days.

(21) Appl. No.: 16/671,087

(22) Filed: Oct. 31, 2019

(51) Int. Cl.
 *B27B 5/36* (2006.01)

(52) U.S. Cl.
 CPC ...................... *B27B 5/36* (2013.01)

(58) Field of Classification Search
 CPC .......... B27B 5/36; B27B 27/08; B27B 27/10; B27B 27/02; Y10T 83/727; Y10T 83/7722; Y10T 83/773; Y10T 83/7697; Y10T 83/7768; Y10T 83/7772; B25H 1/10; B25H 1/02; B23D 45/06; B23D 45/061; B23D 45/062; B23D 45/063; B23D 45/065; B23D 45/066; B23D 45/067; B23D 45/068; B23D 45/042; B23D 45/044; B23D 45/046; B23D 45/048
 USPC ............... 83/471, 471.1, 471.2, 471.3, 477.2
 See application file for complete search history.

(56) References Cited

U.S. PATENT DOCUMENTS

| | | | | |
|---|---|---|---|---|
| 250,712 A | * | 12/1881 | Colburn | B23D 45/107 83/471.1 |
| 1,697,669 A | * | 1/1929 | Tautz | B27B 5/265 269/309 |
| 3,282,309 A | * | 11/1966 | Parker | B23Q 1/30 144/1.1 |
| 4,221,368 A | * | 9/1980 | Channel | B25H 1/00 269/227 |
| 5,473,968 A | * | 12/1995 | Break | B23D 47/025 144/286.5 |
| 5,899,132 A | * | 5/1999 | Break | B27B 5/07 83/471.3 |
| 2005/0120849 A1 | * | 6/2005 | Lee | B28D 1/047 83/471 |
| 2012/0313351 A1 | * | 12/2012 | Chen | B25H 1/04 280/652 |
| 2015/0007702 A1 | * | 1/2015 | Joiner | B27G 5/02 83/13 |
| 2020/0130168 A1 | * | 4/2020 | Van Bergen | B25H 1/16 |

* cited by examiner

*Primary Examiner* — Jennifer S Matthews
(74) *Attorney, Agent, or Firm* — Mestechkin Law Group P.C.

(57) ABSTRACT

A saw assembly for cutting a workpiece is disclosed. The saw assembly includes a platform for supporting the saw assembly on a surface. The saw assembly further includes a table assembly having a saw for cutting the workpiece and a table surface for supporting the workpiece during cutting. The table assembly is pivotably coupled to the platform and is adapted to pivot relative to the platform to position the table surface at an inclination relative to the surface.

7 Claims, 7 Drawing Sheets

SAW ASSEMBLY

TECHNICAL FIELD

The present disclosure relates, generally, to a saw assembly for cutting a workpiece. More particularly, the present disclosure relates to a saw assembly having a table assembly adapted to pivot relative to a platform to facilitate a positioning the table assembly at an inclination relative to a horizontal surface.

BACKGROUND

Generally, circular saws, such as, table saws, miter saws, etc., are designed for cutting or performing other working operations on a workpiece. Circular saws, generally, include a table surface for supporting the workpiece during cutting or any other working operations, and a circular cutter that is adjusted relative to the table surface to vary a depth and/or angle of cut. As the table surface has a fixed length, the workpieces having long lengths may not be properly or adequately supported by the table surface. The lack of reliable support can cause inaccurate cuts, which may translate into loss of time, materials and/or profit for the user.

SUMMARY

The present disclosure provides a saw assembly for cutting a workpiece. The saw assembly includes a platform for supporting the saw assembly on a surface and a table assembly. The table assembly includes a saw for cutting the workpiece and a table surface for supporting the workpiece during cutting. The table assembly is pivotably coupled to the platform and is adapted to pivot relative to the platform to position the table surface at an inclination relative to the surface.

In one embodiment, the table assembly pivots relative to the platform about a pivot axis, wherein the pivot axis is substantially parallel to the surface.

In one embodiment, the saw assembly further includes at least one coupler for pivotally coupling the platform and the table assembly.

In one embodiment, the at least one coupler includes a yoke coupled to the platform and an eye member coupled to the table assembly. The eye member is pivotally attached to the yoke for facilitating the pivoting of the table assembly relative to the platform.

In one embodiment, the at least one coupler further includes a rack attached to the eye member. The rack is configured to slidably receive the table assembly and hold the table assembly.

In one embodiment, the table assembly includes at least one leg portion. The at least one leg portion is, at least partially, received by the rack of the at least one coupler.

In one embodiment, the saw assembly is a table saw assembly.

In one embodiment, the saw extends partly above the table surface for cutting the workpiece.

In another aspect, a saw assembly for cutting a workpiece is disclosed. The saw assembly includes a platform for supporting the saw assembly on a surface. The saw assembly further includes a table assembly having a saw for cutting the workpiece and a table surface for supporting the workpiece during cutting. The saw assembly also includes at least one coupler for pivotally coupling the platform and the table assembly. The table assembly is pivoted relative to the platform to position the table surface at an inclination relative to the surface.

In one embodiment, the table assembly pivots relative to the platform about a pivot axis. The pivot axis is substantially parallel to the surface.

In one embodiment, the at least one coupler includes a yoke coupled to the platform and an eye member coupled to the table assembly. The eye member is pivotally attached to the yoke for facilitating the pivoting of the table assembly relative to the platform.

In one embodiment, the at least one coupler further includes a rack attached to the eye member. The rack is configured to slidably receive the table assembly and hold the table assembly.

In one embodiment, the table assembly includes at least one leg portion. The at least one leg portion is, at least partially, received by the rack of the at least one coupler.

In one embodiment, the saw assembly is a table saw assembly.

In one embodiment, the saw extends partly above the table surface for cutting the workpiece.

In yet another aspect, a table saw assembly for cutting a workpiece is disclosed. The table saw assembly includes a platform for supporting the saw assembly on a surface. The table saw assembly further includes a table assembly having a table surface for supporting the workpiece during cutting and a saw extending partly above the table surface for cutting the workpiece. The table saw assembly also includes at least one coupler for pivotally coupling the platform and the table assembly. The table assembly is pivoted relative to the platform to position the table surface at an inclination relative to the surface.

In one embodiment, the table assembly pivots relative to the platform about a pivot axis. The pivot axis is substantially parallel to the surface.

In one embodiment, the at least one coupler includes a yoke coupled to the platform and an eye member coupled to the table assembly. The eye member is pivotally attached to the yoke for facilitating the pivoting of the table assembly relative to the platform.

In one embodiment, the at least one coupler further includes a rack attached to the eye member. The rack is configured to slidably receive the table assembly and hold the table assembly.

In one embodiment, the table assembly includes at least one leg portion. The at least one leg portion is, at least partially, received by the rack of the at least one coupler.

DETAILED DESCRIPTION

Reference will be made to the figures, showing various embodiments of the fixture and methods for using thereof.

Figure 1:
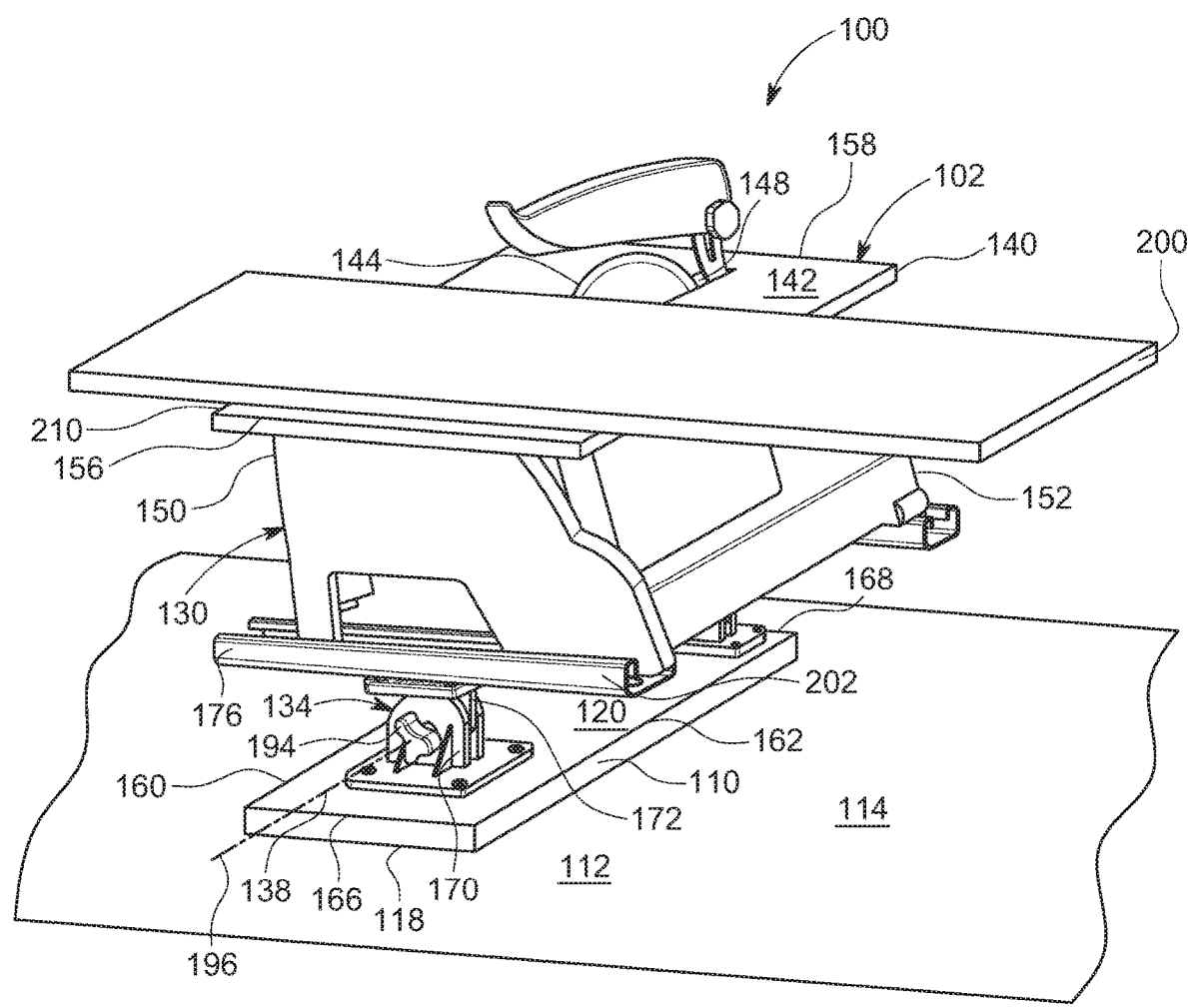
FIG. 1 illustrates a perspective view of a saw assembly positioned on a surface and depicting a table assembly of the saw assembly having a table surface positioned substantially parallel to the surface, in accordance with an embodiment of the disclosure.
Figure 2:
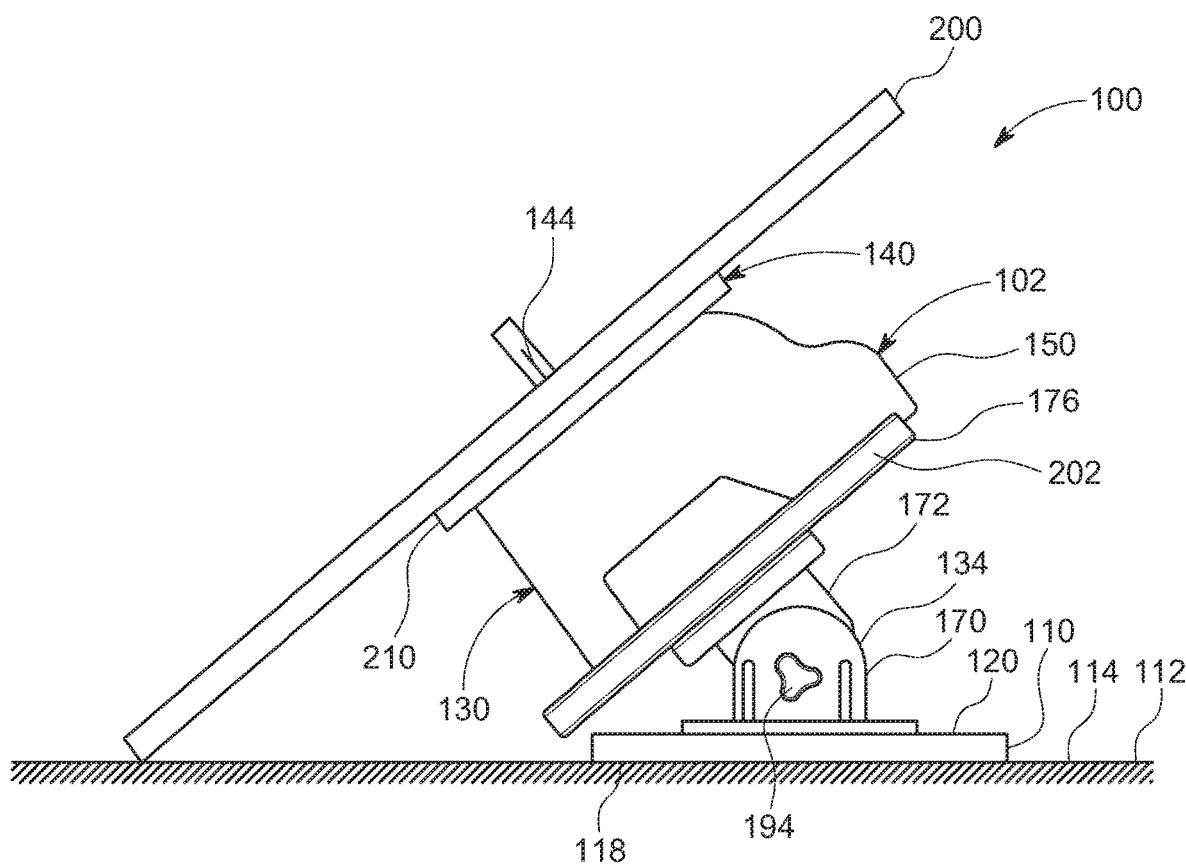
FIG. 2 illustrates a side view of the saw assembly of FIG. 1 depicting the table surface positioned at an inclination relative to the surface, in accordance with an embodiment of the disclosure.

Referring to FIGS. 1 and 2, an exemplary saw assembly 100 adapted for cutting a workpiece 200, such as a wood, is shown. In an embodiment, the saw assembly 100 is a table saw assembly 102. Although the table saw assembly 102 is contemplated as the saw assembly 100, it may be appreciated that any other saw assembly, such as, but not limited to, a miter saw, or any other saw assembly having a circular saw for cutting the workpiece 200 may also be envisioned. The saw assembly 100 includes a platform 110 adapted for placement on a surface 112, for example, a ground surface 114, and thereby supports a positioning of the saw assembly 100 on the surface 112. In an embodiment, the platform 110 may be a flat plate including a first surface 118 adapted to abut/contact the surface 112 and a second surface 120 disposed opposite to the first surface 118. As shown, the platform 110 may include a rectangular shape. Although a rectangular platform is shown and contemplated, it may be appreciated that the platform 110 may include any other shape, such as, but not limited to, a circular shape, an elliptical shape, a square shape, or any other shape known in the art.

Figure 3:
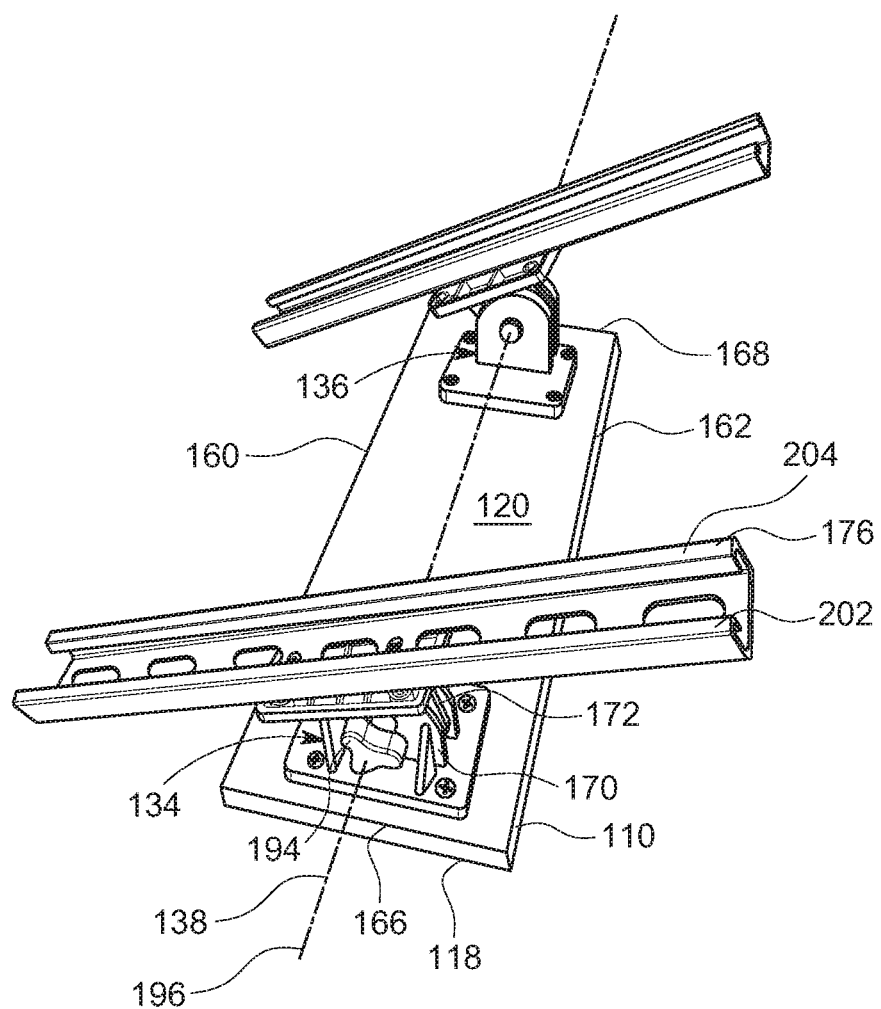
FIG. 3 illustrates a perspective view the saw assembly of FIG. 1 from which the table assembly has been removed, in accordance with an embodiment of the disclosure.
Figure 4:
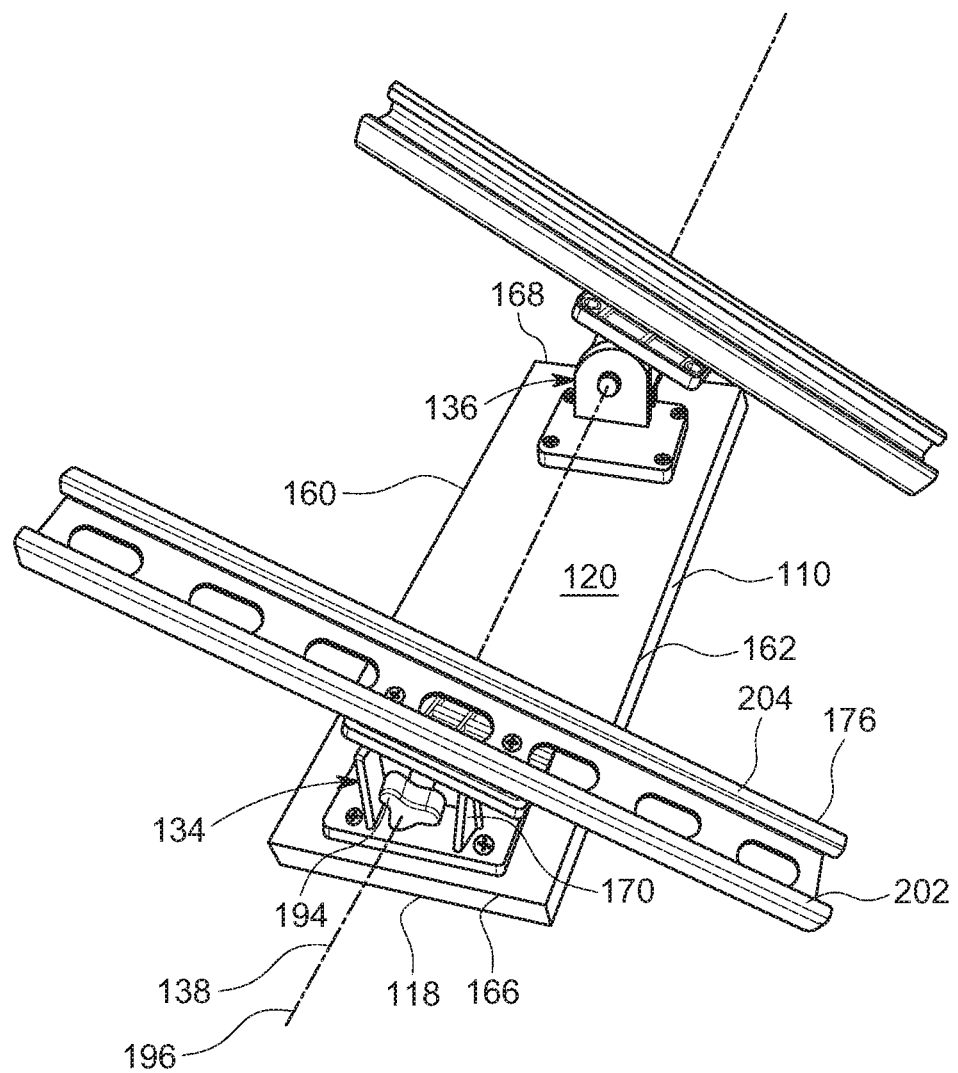
FIG. 4 illustrates a perspective view the saw assembly of FIG. 1 from which the table assembly has been removed, in accordance with an embodiment of the disclosure.
Figure 5:
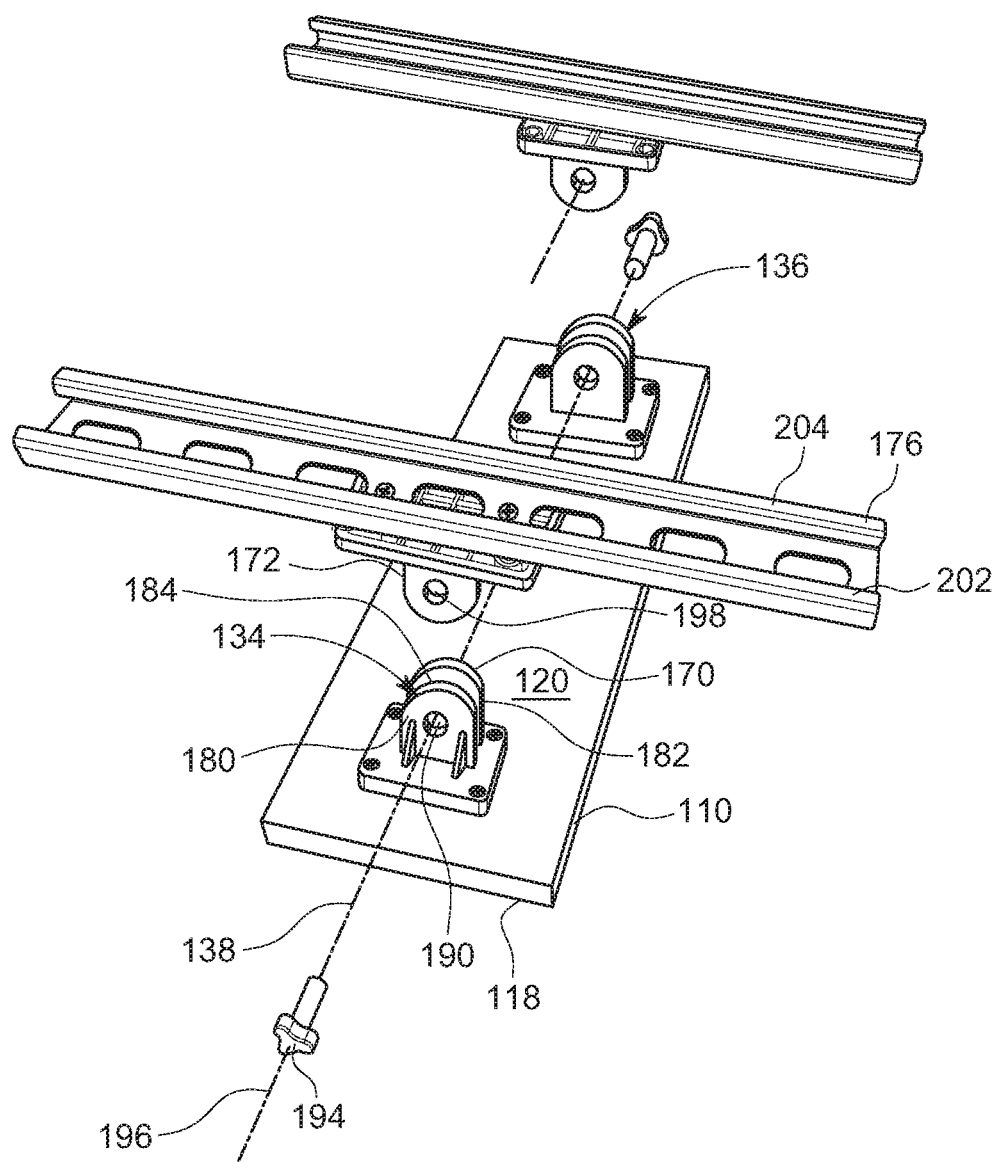
FIG. 5 illustrates an exploded view of a first coupler and a second coupler of the saw assembly of FIG. 1 depicting various components and structural details of the first coupler and the second coupler, in accordance with an embodiment of the disclosure.

The saw assembly 100 further includes a table assembly 130 pivotally coupled to the platform 100 and at least one coupler, for example, a first coupler 134 and a second coupler 136 (best shown in FIG. 3 and FIG. 4), for pivotally coupling/attaching the table assembly 130 to the platform 110. The pivoting of the table assembly 130 relative to the platform 110 facilitates the cutting of the workpieces having long lengths. In an embodiment, the table assembly 130 is adapted to pivot about a pivot axis 138 that is substantially parallel to the surface 112 and/or the second surface 120 of the platform 110. As shown, the table assembly 130 includes a table 140 defining a table surface 142 for supporting the workpiece 200 during the cutting of the workpiece 200, and a saw 144 for cutting the workpiece 200. In an embodiment, the saw 144 may be a circular cutter, and is adapted to extend, at least partially, outwardly and above the table surface 142. As shown, the table surface 142 defines an opening 148 through which the saw 144 extends above the table surface 142. The saw 144 may be mounted on a shaft (not shown) that is rotated by a motor (not shown) for rotating the saw 144. Further, an extension of the saw 144 above the table surface 142 may be adjusted to adjust/vary a depth of the cut.

The table assembly 130 further includes at least one leg portion, for example, a first leg portion 150 and a second leg portion 152 disposed spaced apart from the first leg portion 150 and located/positioned substantially parallel to the first leg portion 150. As shown, the first leg portion 150 may extend downwardly from the table 140, and may be disposed substantially parallel to a first lateral edge 156 of the table 140. Similarly, the second leg portion 152 may extend downwardly from the table 140, and may be disposed substantially parallel to a second lateral edge 158 of the table 140. Although two leg portions 150, 152 are contemplated and shown, it may be appreciated that the table assembly 130 may include a single leg portion. In such a case, the leg portion may be disposed centrally to the table 140, and a single coupler pivotally couples the table assembly 130 to the platform 110.

Further, the first leg portion 150 is coupled to the first coupler 134, while the second leg portion 152 is coupled to the second coupler 136 for facilitating the pivoting of the table assembly 130 relative to the platform 100. The table assembly 130 is arranged to pivot relative to the platform 110 about the pivot axis 138 to position the table surface 142 at an inclination to the surface 112 (shown in FIG. 2). In an embodiment, the first coupler 134 and the second coupler 136 facilitate the pivoting/rotation of the table assembly 130 about the pivot axis 138. In an embodiment, as shown, the pivot axis 138 is substantially parallel to the surface 112 and may be substantially parallel to longitudinal edges 160, 162 of the platform 110 and may be substantially perpendicular to the lateral edges 166, 168 of the platform 110. Therefore, the pivot axis 138 lies in a plane that is substantially parallel to the second surface 120 and/or the surface 112. In certain other implementations (not shown), the table assembly 130 may pivot relative to the platform about an axis that may be substantially perpendicular to the longitudinal edges 160, 162 and may be substantially parallel to the lateral edges 166, 168. In certain other implementations, the table assembly 130 may be adapted to pivot relative to the pivot axis 138 and an axis that lies in the plane of the pivot axis and may be substantially perpendicular to the pivot axis 138.

Referring to FIGS. 1 to 5, a structure, an assembly, a function, and an attachment of the first coupler 134 with the platform 110 and the table assembly 130 is now explained. It may be appreciated that a structure, an assembly, a function, and an attachment of the second coupler 136 with the platform 110 and the table assembly 130 is similar to the structure, the assembly, the function, and the attachment of the first coupler with the platform 110 and the table assembly 130, and therefore, for the sake of clarity and brevity, only the first coupler 134 (herein after referred to as the coupler 134) is explained.

The coupler 134 includes a yoke 170, an eye member 172 pivotably coupled to the yoke 170, and a rack 176 attached/coupled to the first leg portion 150. The yoke 170 may be attached to the platform 110, and may include a pair of members, for example, a first member 180 and a second member 182 (best shown in FIG. 5) disposed spaced apart and substantially parallel to the first member 180, thereby defining a gap 184 (shown in FIG. 5) therebetween. In an implementation, the yoke 170 is removably attached to the platform 110 using a plurality of fasteners. Alternatively, the yoke 170 may be integrally formed with the platform 110, and may extend outwardly and upwardly from the second surface 120 of the platform 110. Further, the first member 180 may define a first hole 190 (shown in FIG. 5) and the second member may define a second hole disposed coaxial to the first hole 190. The first hole 190 is a though hole extending through an entire width of the first member 180. Similarly, the second hole is a through hole extending through an entire width of the second member 182. The yoke 170 may be pivotally attached to the eye member 172 via a pin 194 extending through the first hole 190 and the second hole. In an embodiment, the pin 194 may be a cylindrical member and an axis 196 (shown in FIGS. 1 to 4) of the pin 194 is coaxial with the pivot axis 138.

To facilitate the pivotal coupling of the eye member 172 with the yoke 170, the eye member 172 may include a through hole 198 (shown in FIG. 5) through which the pin 194 extends. As shown in FIGS. 1 to 4, the eye member 172 is disposed within the gap 184, and therefore the eye member 172 may be sandwiched/disposed between the first member 180 and the second member 182. In certain embodiments, the yoke 170 may include only the first member 180 and the second member 182 may be omitted. In such cases, the eye member 172 may be disposed abutting a side surface of the first member 180 such that the first hole 190 and the through hole 198 may be disposed coaxially to each other.

Further, an end of the eye member 172 is attached to the rack 176. In an implementation, the rack 176 may be removably coupled/attached to the eye member 172 using fasteners. Alternatively, the rack 176 may be integrally formed with the eye member 172. As shown, the rack 176 may extend in a direction substantially parallel to the first lateral edge 156 of the table 140 and may include a pair of guides, for example, a first guide 202 (best shown in FIGS. 3 to 5) and a second guide 204 (FIGS. 3 to 5) to slidably receive and hold the first leg portion 150. In this manner, the rack 176 facilitates an attachment of the first leg portion 150, and hence the table assembly 130 to the eye member 172. In certain scenarios, the rack 176 may be omitted. In such a case, the eye member 172 is attached/coupled to the first leg portion 150. In certain other implementations, the eye member 172 may be integrally formed with the first leg portion 150. Additionally, or optionally, the coupler 134 may include a stopper (not shown) for retaining the table assembly 130 relative to platform 110 at a desired inclination/angle, and prevents an undesired movement/pivoting of the table assembly 130 during cutting of the workpiece 200. The stopper may be attached to the yoke 170 and the eye member 172 after positioning the table assembly 130 at the desired inclination relative to the platform 110. The stopper, upon attachment with the yoke and the eye member prevent any additional pivoting motion between the platform 110 and the table assembly 130.

Figure 6:
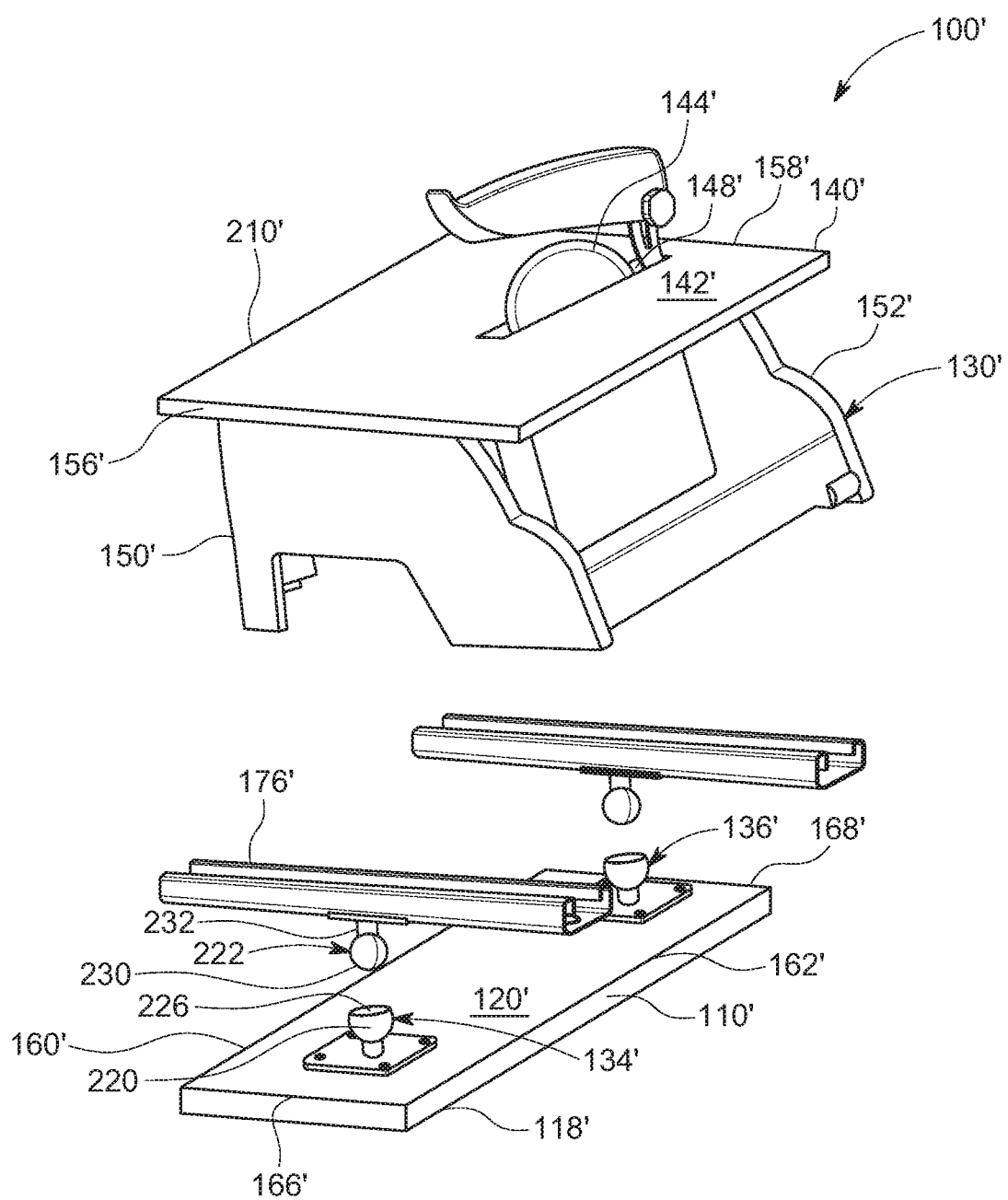
FIG. 6 illustrates an exploded view of a saw assembly, in accordance with an alternative embodiment of the disclosure.

Referring to FIG. 6, an exploded view of a saw assembly 100' according to an alternative embodiment is shown. The saw assembly 100' is similar in structure, construction, and function to that of the saw assembly 100 except that a first coupler 134' and a second coupler 136' of the saw assembly 100' is different in structure and function from the first coupler 134 and the second coupler 136 of the saw assembly 100. The saw assembly 100' includes a platform 110', a table assembly 130' pivotally coupled/engaged with the platform 110', and the first coupler 134' and the second coupler 136' to pivotally couple/engage the table assembly 130' with the platform 110' to facilitate a positioning of a table surface 142' at an inclination to the surface 112. The platform 110' may include a first surface 118', a second surface 120', a pair of longitudinal edges 160', 162', and a pair of lateral edges 166',168'. Further, the table assembly 130' may include a table 140' having the table surface 142' defining an opening 148', a saw 144' extending, at least partly, through the opening, 148', at least one leg portion, for example, a first leg portion 150' and a second leg portion 152', a first lateral edge 156', a second lateral edge 158', and a longitudinal edge 210'.

A structure, an assembly, a function, and an attachment of the first coupler 134' with the platform 110' and the table assembly 130' is now explained. It may be appreciated that a structure, an assembly, a function, and an attachment of the second coupler 136' with the platform 110' and the table assembly 130' is similar to the structure, the assembly, the function, and the attachment of the first coupler 134' with the platform 110' and the table assembly 130', and therefore, for the sake of clarity and brevity, only the first coupler 134' (herein after referred to as the coupler 134') is explained.

As shown, the coupler 134' includes a socket 220, a spherical structure 222 engaged or coupled with the socket 220, and a rack 176' adapted to be attached/coupled/engaged with the first leg portion 150' of the table assembly 130'. The socket 220 may be attached to the platform 110', and may include a cavity 226 for receiving, at least partially, the spherical structure 222 to facilitate the pivoting of the table assembly 130' relative to the platform 110'. In an embodiment, the cavity 226 may include a shape of a partial sphere. In an embodiment, the socket 220 may include a hollow hemispherical shape. In an embodiment, the socket 220 may be removably attached to the platform 110' using a plurality of fasteners. Alternatively, the socket 220 may be integrally formed with the platform 110'.

Further, the spherical structure 222 may include a spherical member 230 and an elongated member 232 extending outwardly from the spherical member 230. To facilitate the pivotal coupling of the table assembly 130' relative to the platform 110', the spherical member 230 may be disposed/inserted, at least partly, inside the cavity 226 such that the spherical member 230 moves inside the cavity 226, thereby enabling the pivoting of the spherical structure 222 relative to the socket 220, and hence facilitating the positioning of the table surface 142' at an inclination to the surface 112. Further, the elongated member 232 is attached to the rack 176'. It may be appreciated that a structure of the rack 176' is similar to the structure of the rack 176. In an implementation, the rack 176' may be removably coupled/attached to elongated member 232 (i.e. the spherical structure 222) using fasteners. Alternatively, the rack 176' may be integrally formed with the elongated member 232 (i.e. the spherical structure 222). As shown, the rack 176' may extend in a direction substantially parallel to the first lateral edge 156' of the table 140' and is adapted to slidably receive and hold the first leg portion 150'. In this manner, the rack 176' facilitates an attachment of the first leg portion 150', and hence, the table assembly 130' to the spherical structure 222. In certain scenarios, the rack 176' may be omitted. In such a case, the spherical structure 222 (i.e. the elongated member 232) is directly attached/coupled to the first leg portion 150'. In certain other implementations, the spherical structure 222 (i.e. the elongated member 232) may be integrally formed with the first leg portion 150'. Although, the socket 220 and the spherical structure 222 are shown to be, respectively, coupled with the platform 110' and the first leg portion 150' or the rack 176', it may be envision that the socket 220 may be coupled to the first leg portion 150', while the spherical structure 222 may be coupled to the platform 110'.

Figure 7:
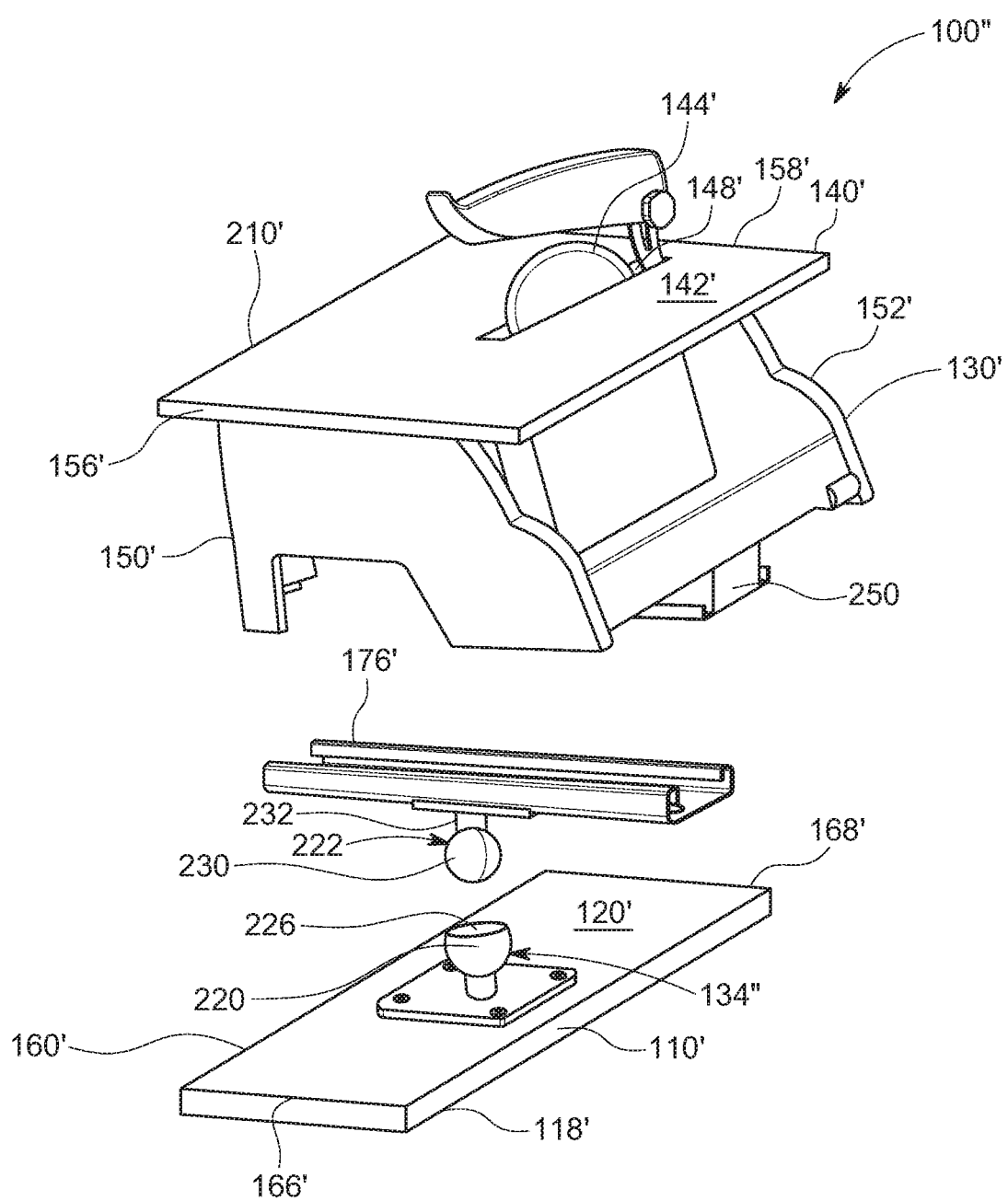
FIG. 7 illustrates an exploded view of a saw assembly having a single coupler, in accordance with yet another alternative embodiment of the disclosure.

Although two couplers 134', 136' are contemplated for pivotally coupling the table assembly 130' with the platform 110', it may be appreciated that a single coupler may be utilized for pivotally coupling the table assembly with the platform. Referring to FIG. 7, an exploded view of an exemplary saw assembly 100" having a single coupler is shown. The saw assembly 100" is similar in structure, construction, and function to that of the saw assembly 100' except that the saw assembly 100" include a single coupler 134" (hereinafter referred to as the coupler 134") instead of two couplers. Further, a structure and function of the coupler 134" is similar to the coupler 134' of the saw assembly 100' except for the positioning of the coupler 134". Further, the elements of the saw assembly 100" having similar constructional and structural aspects as that of the elements of the saw assembly 100' will have same reference numerals. As shown, the coupler 134" is attached to a central portion of the table assembly 130' and the platform 110' to facilitate a pivotal coupling of the table assembly 130' relative to the platform 110'. For facilitating an attachment of the coupler 134" with the table assembly 130', the table assembly 130' may include a central leg portion 250 located centrally to the table assembly 130' and disposed substantially parallel to the first leg portion 150' and the second leg portion 152'. The central leg portion 250 is adapted for attachment to the rack 176'. Also, the socket 220 is located centrally to the platform 110'. Further, it may be appreciated that a size of the coupler 134" may be larger than a size of the coupler 134'

An operation of the saw assembly 100, 100', 100" is now explained. For cutting the workpiece 200 having a long length, the operator, at first, may place a portion of the workpiece 200 on the table surface 142,142'. However, the table surface 142, 142' may not adequately support the workpiece 200 as the table assembly 130, 130' may disposed in such a manner that the table surface 142,142' is disposed substantially parallel to the surface 112. For example, a portion of the workpiece 200 extending outwardly of a longitudinal edge 210, 210' of the table surface 142, 142' may be relatively larger than a remaining portion of workpiece 200 that is disposed on the table surface 142, 142'. In this case, the remaining portion, at least partly, of the workpiece 200 may tend to lose contact from the table surface 142, 142'. Accordingly, the workpiece 200 is inadequately supported by the table surface 142, 142' for performing cutting. In such a case, the operator may move/pivot the table assembly 130, 130' relative to the platform 110, 110' to position the table surface 142, 142' at an angle/inclination to the surface 112. The operator may pivot the table assembly 130, 130' such that an end of the portion of the workpiece 200 may abut the surface 112 (as shown in FIG. 2), while the remaining portion of the workpiece 200 completely abuts the table surface 142, 142' (as shown in FIG. 2). In this manner, the saw assembly 100, 100', 100" adequately and reliably supports the workpiece 200 during the cutting of the workpiece 200, thereby ensures accurate cuts.

LIST OF ELEMENTS 100 saw assembly
100' saw assembly
100" saw assembly
102 table saw assembly
110 platform
110' platform
112 surface
114 ground surface
118 first surface
118' first surface
120 second surface
120' second surface
130 table assembly
130' table assembly
134 first coupler
134' first coupler
134" coupler
136 second coupler
136' second coupler
138 pivot axis
140 table
140' table
142 table surface
142' table surface
144 saw
144' saw
148 opening
148' opening
150 first leg portion
150' first leg portion
152 second leg portion
152' second leg portion
156 first lateral edge
156' first lateral edge
158 second lateral edge
158' second lateral edge
160 longitudinal edge
160' longitudinal edge
162 longitudinal edge
162' longitudinal edge
166 lateral edge
166' lateral edge
168 lateral edge
168' lateral edge
170 yoke
172 eye member
176 rack
176' rack
180 first member
182 second member
184 gap
190 first hole
194 pin
196 axis
198 through hole
200 workpiece
202 first guide
204 second guide
210 longitudinal edge
210' longitudinal edge
220 socket
222 spherical structure
226 cavity
230 spherical member
232 elongated member
250 central leg portion

What is claimed is:

1. A saw assembly for cutting a workpiece, the saw assembly comprising:
    a platform for supporting the saw assembly on a surface; and
    a table saw having a saw for cutting the workpiece, a table surface for supporting the workpiece during cutting, a first leg portion and a second leg portion each affixed to and extending downward from the table surface, at least one rack having a channel that receives at least one of the first and second leg portions in a sliding relationship, and at least one pivoting coupler connected to the at least one rack at an end opposite the channel and to the platform, the table saw therewith pivotably coupled to the platform and is adapted to pivot relative to the platform in a single axis to position the table surface at an inclination relative to the surface.

2. The saw assembly of claim 1, wherein the single pivot axis is substantially parallel to the surface.

3. The saw assembly of claim 1 further including at least one ball and socket type coupler for pivotally coupling the platform and the table assembly.

4. The saw assembly of claim 1, wherein the at least one pivoting coupler includes a yoke coupled to the platform and an eye member coupled to the at least one rack, wherein the eye member is pivotally attached to the yoke for facilitating the pivoting of the table assembly relative to the platform.

5. The saw assembly of claim 1, wherein the at least one rack comprises a first rack and a second rack, each having a channel therein, and wherein the first rack receives the first leg portion and the second rack receives the second leg portion.

6. A saw assembly for cutting a workpiece, the saw assembly comprising:
   a platform for supporting the saw assembly on a surface; and
   a table saw having a saw for cutting the workpiece, a table surface for supporting the workpiece during cutting, a first leg portion and a second leg portion each affixed to and extending downward from the table surface, a central leg portion disposed between the first and second leg portions, a single rack having a channel that receives the central leg portion in a sliding relationship, and a single ball and socket type coupler connected to the rack at an end opposite the channel and to the platform, the table saw therewith pivotably coupled to the platform and is adapted to pivot relative to the platform to position the table surface at an inclination relative to the surface.

7. The saw assembly of claim 6, wherein the first, second, and central leg portions are substantially parallel to each other.

* * * * *